United States Patent [19]

Satake

[11] Patent Number: 5,481,663

[45] Date of Patent: Jan. 2, 1996

[54] WORD PROCESSORS FOR PERFORMING AN AUTOMATIC LAYOUT PROCESS

[75] Inventor: Teruyuki Satake, Higashimurayama, Japan

[73] Assignee: Casio Computer Co., Ltd., Tokyo, Japan

[21] Appl. No.: 47,964

[22] Filed: Apr. 15, 1993

[30] Foreign Application Priority Data

Apr. 22, 1992 [JP] Japan ................................. 4-127921

[51] Int. Cl.⁶ .................................................. G06F 17/24
[52] U.S. Cl. ............................................ 395/146; 395/147
[58] Field of Search .................................. 395/144–148, 395/155; 364/419.17, 419.10

[56] References Cited

U.S. PATENT DOCUMENTS

| | | | |
|---|---|---|---|
| 4,949,287 | 8/1990 | Yamaguchi et al. | 364/523 |
| 5,031,121 | 7/1991 | Iwai et al. | 364/523 |
| 5,179,650 | 1/1993 | Fukui et al. | 395/148 |
| 5,347,625 | 9/1994 | Kajimoto et al. | 395/145 |

OTHER PUBLICATIONS

ClarisWorks Handbook, Jul. 7, 1991, Claris Corporation pp. 3–11 to 3–5 HF558.4.C58 C531 1991.

*Primary Examiner*—Mark K. Zimmerman

*Attorney, Agent, or Firm*—Frishauf, Holtz, Goodman, Langer & Chick

[57] ABSTRACT

A word processor with an automatic layout function which automatically moves a possible figure, related to a text of a document to be moved in an automatic layout process, in conjunction with the movement of the text. For example, when a text surrounded in a horizontally long rectangular frame figure and related in position to the figure is to be shifted rightward, a CPU analyses the layout structure of the document the data on which is stored in a document memory 12-1, stores data on the result of the analysis in an analysis data buffer 12-3 and determines whether the result of the analysis meets layout rules the data on which is set in an edition rule dictionary memory 12-2. In this case, if the text data does not meet the layout rules and the text data is to be moved rightward, the horizontally long frame figure related in position to the text is also moved automatically rightward in conjunction with the movement of the text. In summary, when the text is to be moved in an automatic layout process, the figure also is moved automatically in conjunction with the movement of the text.

1 Claim, 8 Drawing Sheets

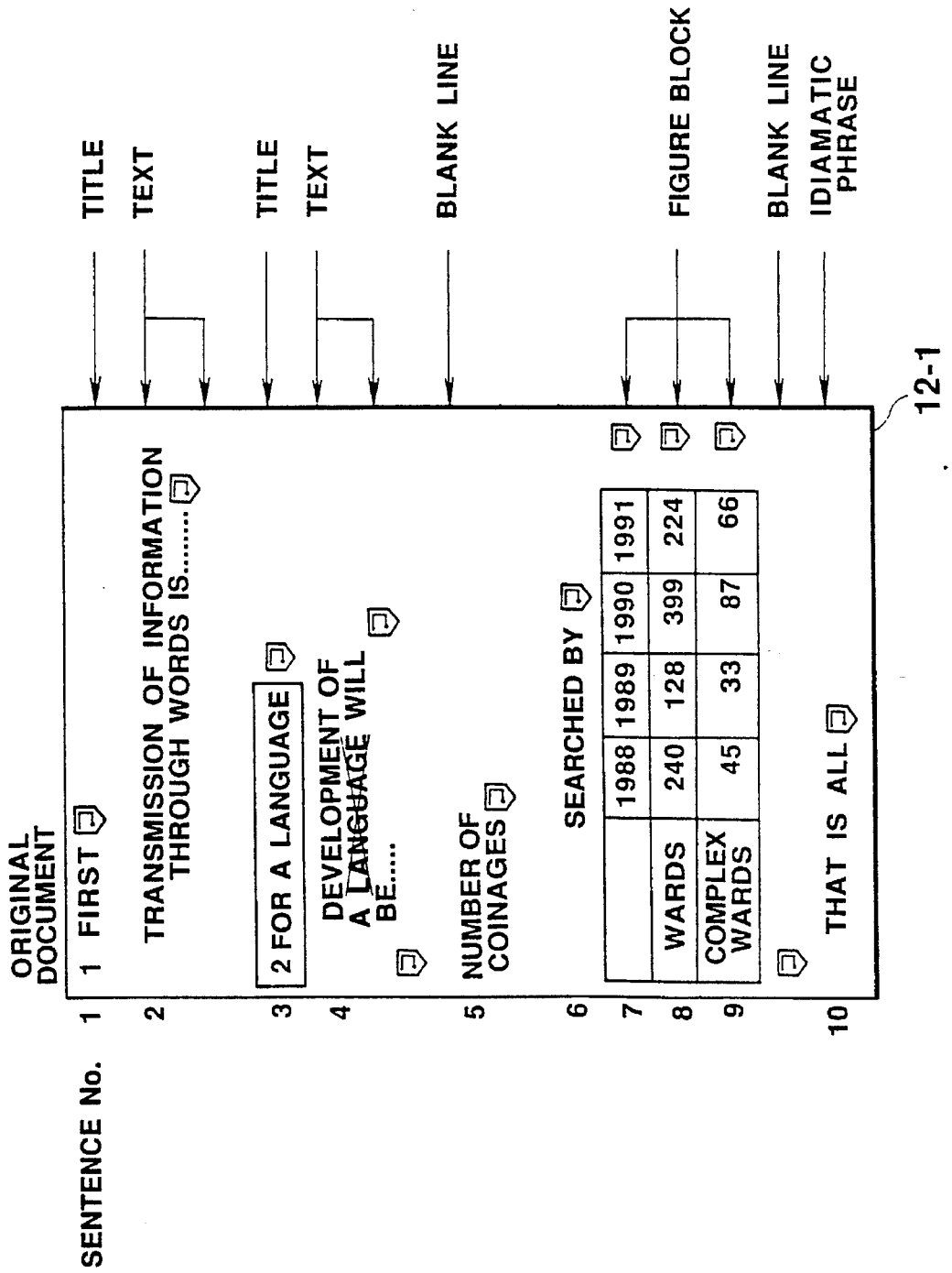

FIG.6A 12-3

| SEN-TENCE No. | POSITION | MOVEMENT QUANTITY | |
|---|---|---|---|
| 1 | LINE 1,PLACE 1-<br>LINE 1,PLACE 6 | | ← TITLE |
| 2 | LINE 2,PLACE 1-<br>LINE 3,PLACE 6 | | ← TEXT |
| 3 | LINE 4,PLACE 1-<br>LINE 4,PLACE 8 | | ← TITLE |
| 4 | LINE 5,PLACE 1-<br>LINE 6,PLACE 10 | | ← TEXT |
| 5 | LINE 8,PLACE 5-<br>LINE 8,PLACE 8 | | ← CHARACTER STRING INCIDENTAL TO FIGURE BLOCK |
| 6 | LINE 9,PLACE 11-<br>LINE 9,PLACE 12 | | |
| 7 | LINE 10,PLACE 3-<br>LINE 10,PLACE 12 | | |
| 8 | LINE 11,PLACE 1-<br>LINE 11,PLACE 12 | | ← CHARACTER STRING IN FIGURE BLOCK |
| 9 | LINE 12,PLACE 1-<br>LINE 12,PLACE 12 | | |
| 10 | LINE 14,PLACE 1-<br>LINE 14,PLACE 2 | | ← IDIOMATIC PHRASE |

CHARACTER STRING

FIG.6B 12-3

| FIG.No. | POSITION | RELATED SENTENCE No. | STATE | |
|---|---|---|---|---|
| 1 | LINE 4,PLACE 1-<br>LINE 4,PLACE 8 | 3 | 3 | ← HORIZONTALLY LONG FRAME FIGURE |
| 2 | LINE 5,PLACE 1-<br>LINE 5,PLACE 2 | 4 | 3 | ← "X" MARK FIGURE |
| 3 | LINE 10,PLACE 1-<br>LINE 12,PLACE 12 | 7~9 | 1.2 | ← TABLE FRAME FIGURE BLOCK |

FIGURE

WORD PROCESSORS FOR PERFORMING AN AUTOMATIC LAYOUT PROCESS

BACKGROUND OF THE INVENTION

1. Field of the Invention

The present invention relates to word processors with an automatic layout function which automatically changes the layout structure of a document, and more particularly to a word processor in which if there is in a document a figure related to a text which is moved to a proper position in an automatic layout process, the figure is also moved automatically in conjunction with the movement of the text.

2. Description of the Prior Art

Generally, in a word processor, the layout of an overall document created so far is arranged during or after creation of the document, and the text is then printed out.

Although such arrangement of the document layout is an accessary work in the creation of the document, it takes much time and labor. Thus, some word processors with an automatic layout function which analyzes the layout structure of a document and, if the text does not meet the rules of layout the data on which is preset in a dictionary memory as a result of the analysis, moves the text automatically to a proper position where the text meets the rules of layout that have been developed and are commercially available as articles.

Although, generally, the functions of editing a document and a figure thus are independent of each other in a word processor, the positions of the text and figure are related to each other in an actual document in many cases; for example, a character string is surrounded with a ruled line to emphasize part of the document. In such a case, conventionally, when a text is automatically moved by the automatic layout function, the user is required correspondingly to designate figures, related to the text, one by one while operating keys to move the figures.

For example, as shown in FIG. 7, when stored text characters "A B C D" are surrounded with a horizontally long rectangular frame figure, and only the document characters are edited by the automatic layout function to a "rightward shifted" position, the positions of the text and figure would deviate greatly from their desired positions, as shown. Thus, the user is required to perform an operation to move the figure to its original position.

Thus, if many figures are contained in a document, the user is required to perform such troublesome operations many times, which is a burden on the user to thereby reduce the work efficiency.

SUMMARY OF THE INVENTION

The present invention is characterized as follows: When the automatic function operates, the layout structure of document is analyzed. As a result, when the text does not meet the rules of layout the data on which is preset in a dictionary memory, it is automatically moved to its proper position. At this time, when determining means determines that there is a figure which is related in position to the text, figure moving means moves the figure in conjunction with the direction and quantity of movement of the corresponding text.

According to the present invention, if there is a figure related to the text which is moved to a proper position in the automatic layout process, the figure can be moved automatically in conjunction with the movement of the text. Thus, the user is not required to perform a troublesome operation of designating the figures one by one while moving the corresponding figures after the automatic layout process. Thus, a change of the layout is achieved steadily without requiring the user to do that troublesome work.

BRIEF DESCRIPTION OF THE DRAWINGS

FIGS. 1–4, 5A, 5B, 6A and 6B show an embodiment of the present invention.

FIG. 1 is a block diagram of a word processor with an automatic layout function as an embodiment of the present invention.

FIG. 2 is a flowchart indicative of part of an automatic layout process.

FIG. 3 is a flowchart indicative of an automatic layout process continued from the flowchart of FIG. 2.

FIG. 4 is a flowchart indicative of the details of a character string movement quantity detecting process at step A15 of FIG. 2.

FIGS. 5A and 5B show automatic layout process where FIGS. 5A and 5B show examples of the layout of a document before and after the document is processed, respectively.

FIGS. 6A and 6B show an analysis data buffer 12-3 where data on the result of analysis of the document of FIGS. 5A and 5B are stored.

FIG. 7 shows the prior art where a figure is moved by a key-in operation after the automatic layout process.

DESCRIPTION OF THE PREFERRED EMBODIMENTS

Figure 1:
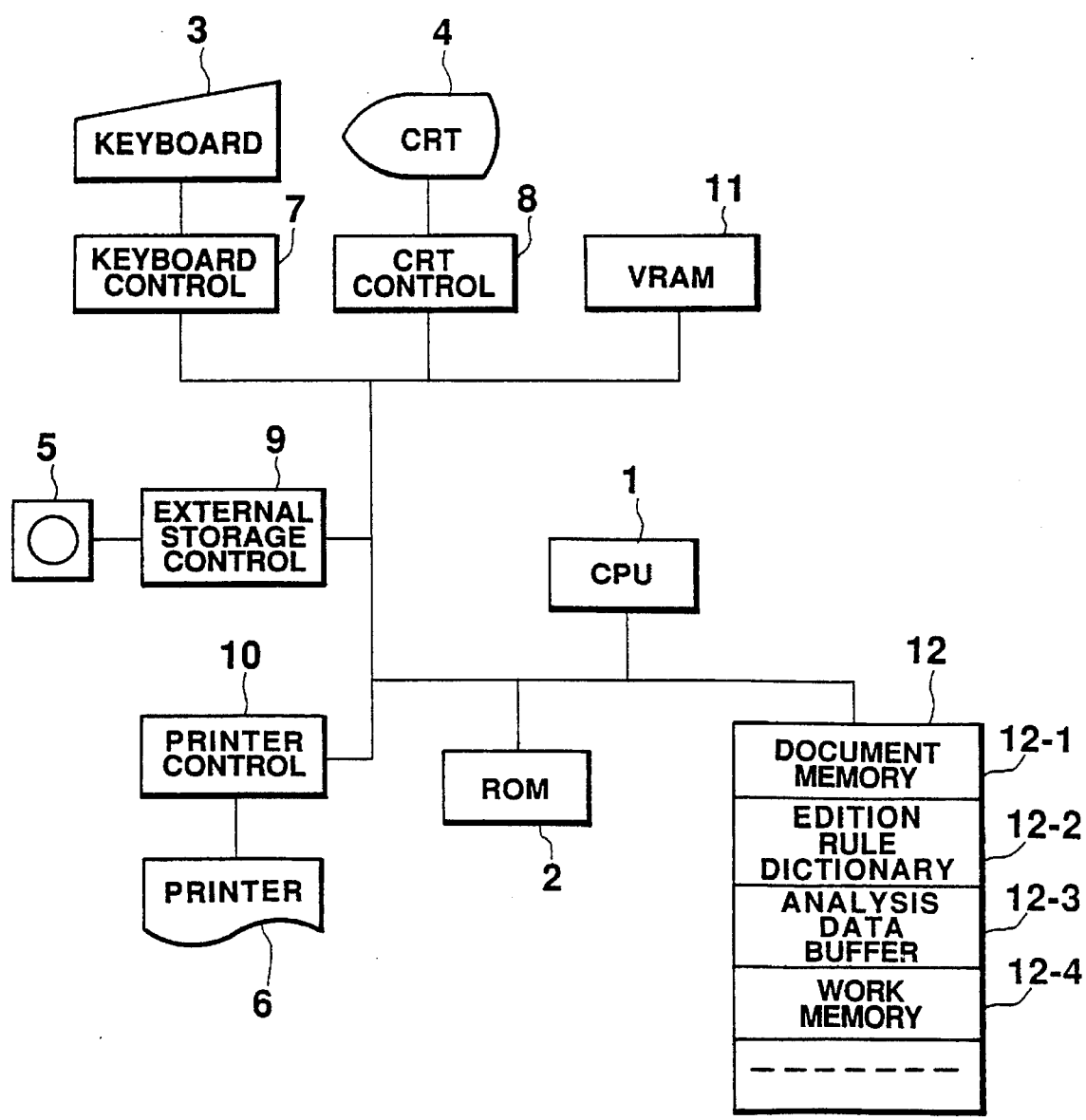

FIG. 1 shows a word processor with an automatic layout function according to the present invention. A CPU 1 controls various operations of the word processor in accordance with a system program stored in a ROM 2. CPU 1 is connected to a keyboard 3, a CRT display 4, a disk unit 5 and a printer 6 through a keyboard control unit 7, a CRT control unit 8, an external storage control unit 9 and a printer control unit 10, respectively, as peripheral devices. CPU 1 controls the input/output operations of those elements. When a key on the keyboard 3 is operated, the keyboard control unit 7 generates and outputs a key code corresponding to the operated key to CPU 1. CRT control unit 8 reads out image data stored in a video RAM (VRAM) 11 and displays the corresponding image on the CRT display 4 under control of CPU 1. The external storage control unit 9 controls a data access operation to the disk unit 5 which stores data on document files, for example. The printer control unit 10 causes the printer 6 to print out the document read out of a document memory 12-1 in the RAM 12 under control of CPU 1. RAM 12 is a main storage which is provided with an edition rule dictionary 12-2, an analysis data buffer 12-3, and a work memory 12-4 in addition to the document memory 121. This document memory 12-1 is a text memory which stores keyed-in text data and figure data, for example, on ruled lines, which are keyed in and created as usual. The edition rule dictionary memory 12-2 composes an automatic layout function and stores data on manufacturer prepared layout rules which to move the text to its proper position. In this case, for example, the following exists as the rules of layout:

Layout Rule 1: A character string containing a punctuation mark should be handled as text, which should be disposed at a position indented by three characters from the directly preceding title. In the present embodiment, the character string is a text unit delimited by a line feed mark;

Layout Rule 2: A beforehand registered idiomatic phrase is displayed at a registered position. For example, a "date" is a predetermined idiomatic phrase and is displayed at a registered position, such as at a rightward shifted position in correspondence to the idiomatic phrase.

Layout Rule 3: A character string influenced by a figure covering a plurality of lines (for example, a character string in a figure) is disposed at a central position with the width of the figure block being handled as that of the character string.

Layout Rule 4: A character string which does not meet any of the layout rules 1–3 should be handled as a title, which should be placed at a leftward shifted position.

The analysis data buffer 12-3 temporarily stores the result of CPU 1 analysis of the layout structure of a document the data on which is stored in the document memory 12-1. CPU 1 performs an automatic layout process on the basis of the contents of the analysis data buffer 12-3. In this case, when CPU 1 moves the text to a position where the text meets the layout rules, data on which is registered in the edition rule dictionary memory 12-2, it determines whether there is a figure related in position to the text. If so, CPU 1 moves the figure in conjunction of the movement of the text concerned. That is, the automatic layout function of the present embodiment automatically moves the text and figure, which are related to each other, in a lump to an optimal position in accordance with the rules in the edition rule dictionary memory 12-2.

Figure 3:
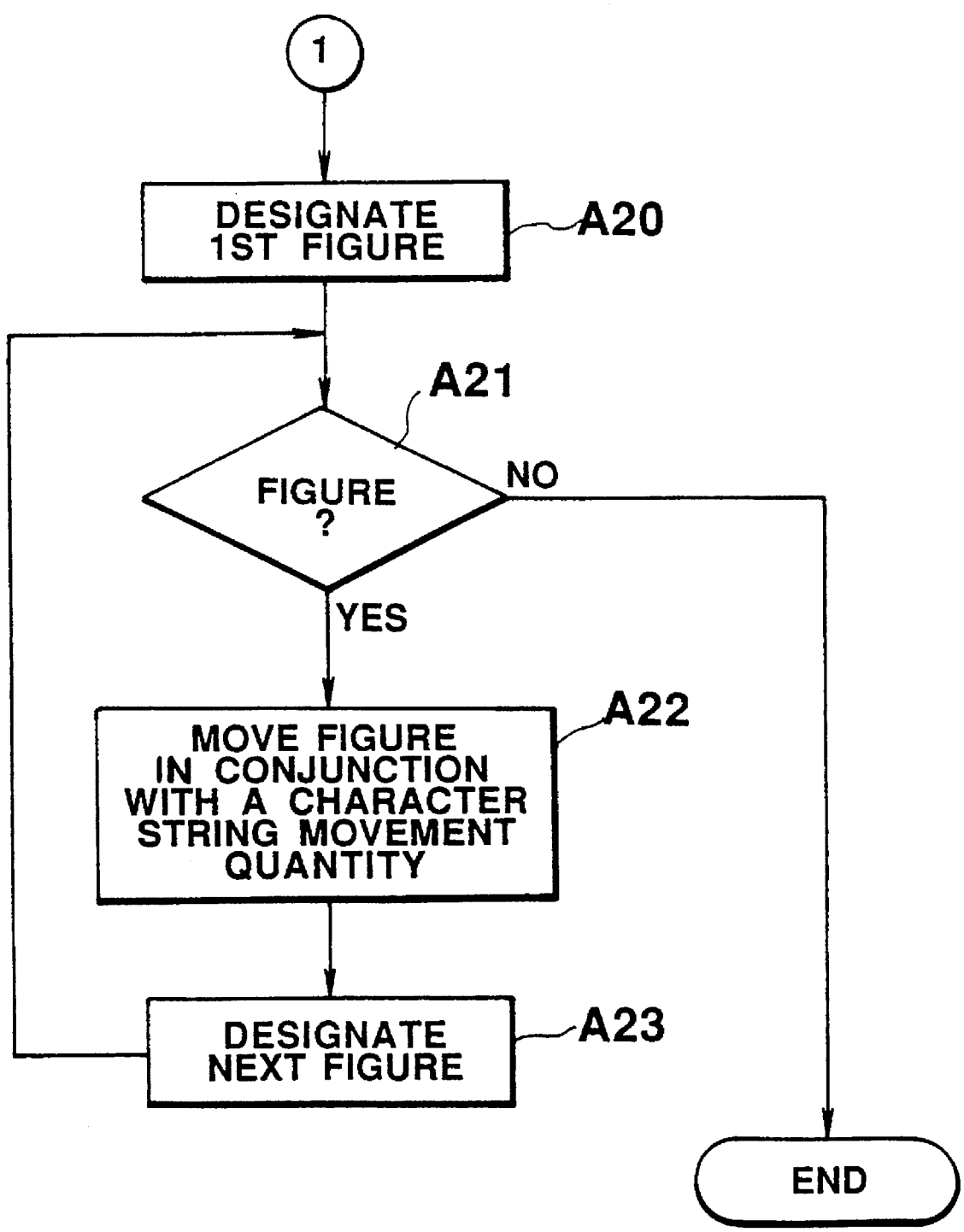
Figure 4:
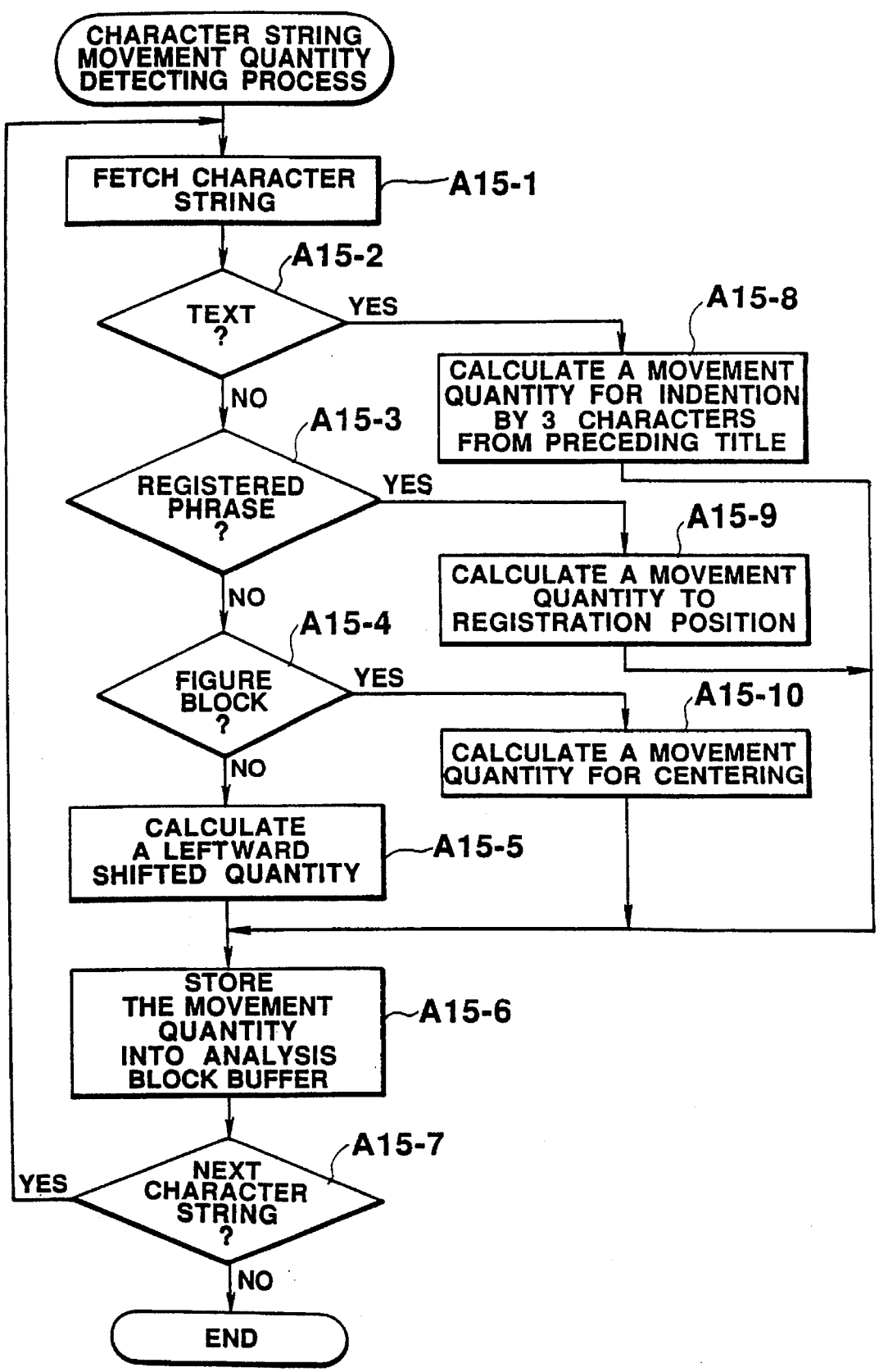
Figure 5B:
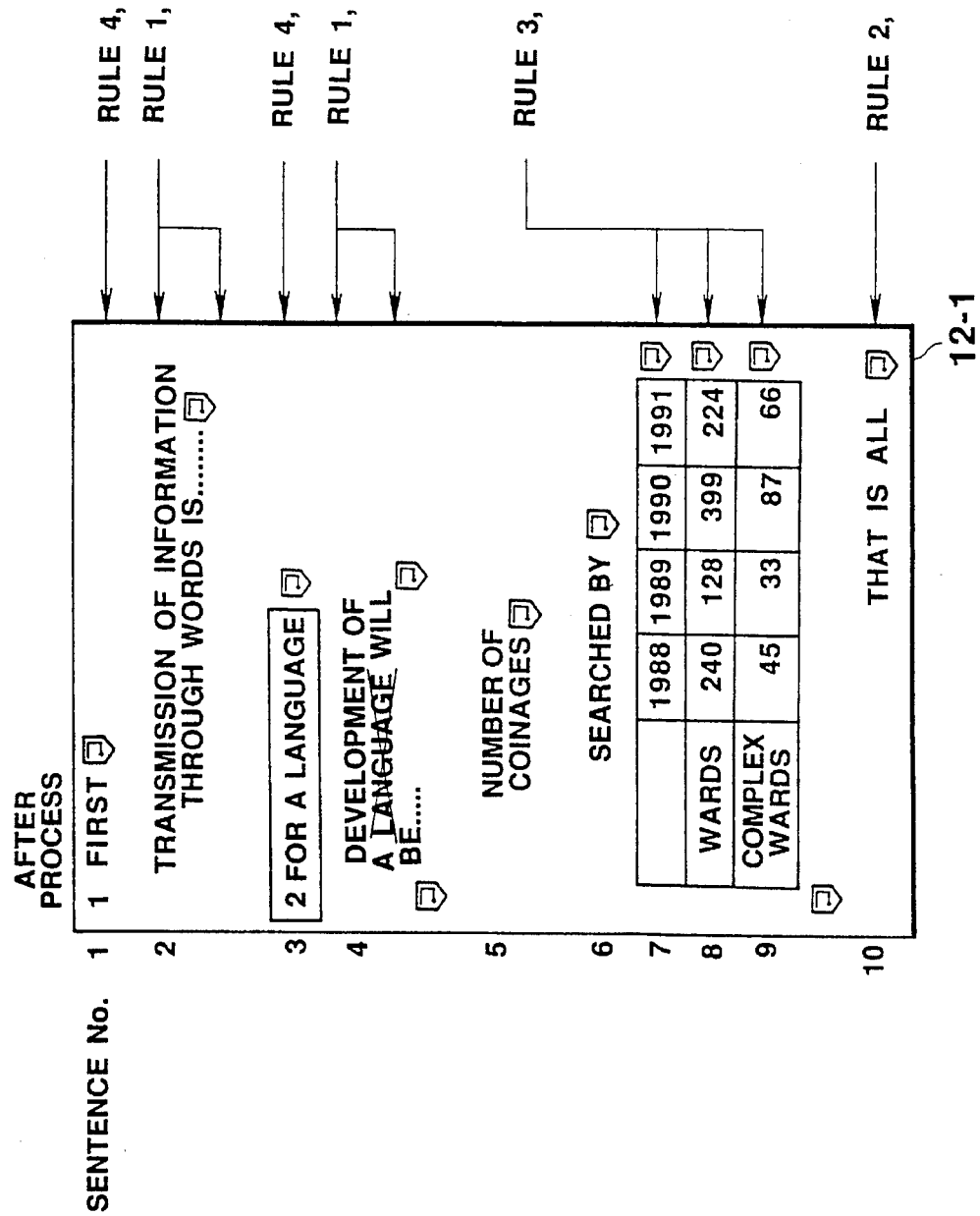
Figure 7:
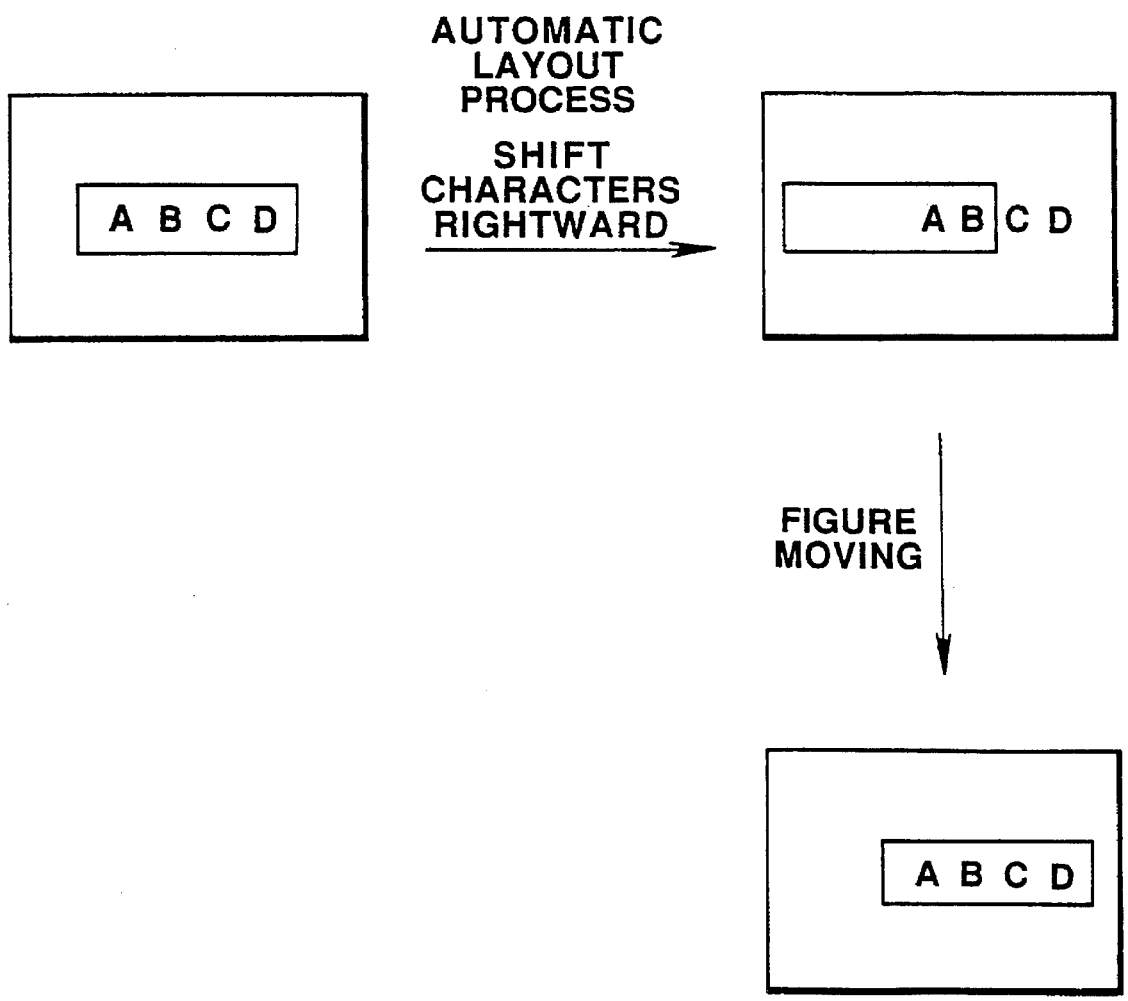
FIG. 7 shows the prior art.

The automatic layout process according to the present embodiment will be described below with respect to FIGS. 2–4. FIGS. 5A and 5B shows examples of a document the data on which was stored in the document memory 12-1 before and after execution of the automatic layout process. FIGS. 6A and 6B show specified examples of the layout structure of a document analyzed by CPU 1, the data on which layout structure is stored in the analysis data buffer 12-3 in the course of the automatic layout process. FIGS. 6A and 6B show the analyzed contents of the document and its figure. The automatic layout process will be described below with respect to the illustrative document of FIGS. 5A and 5B.

Figure 2:
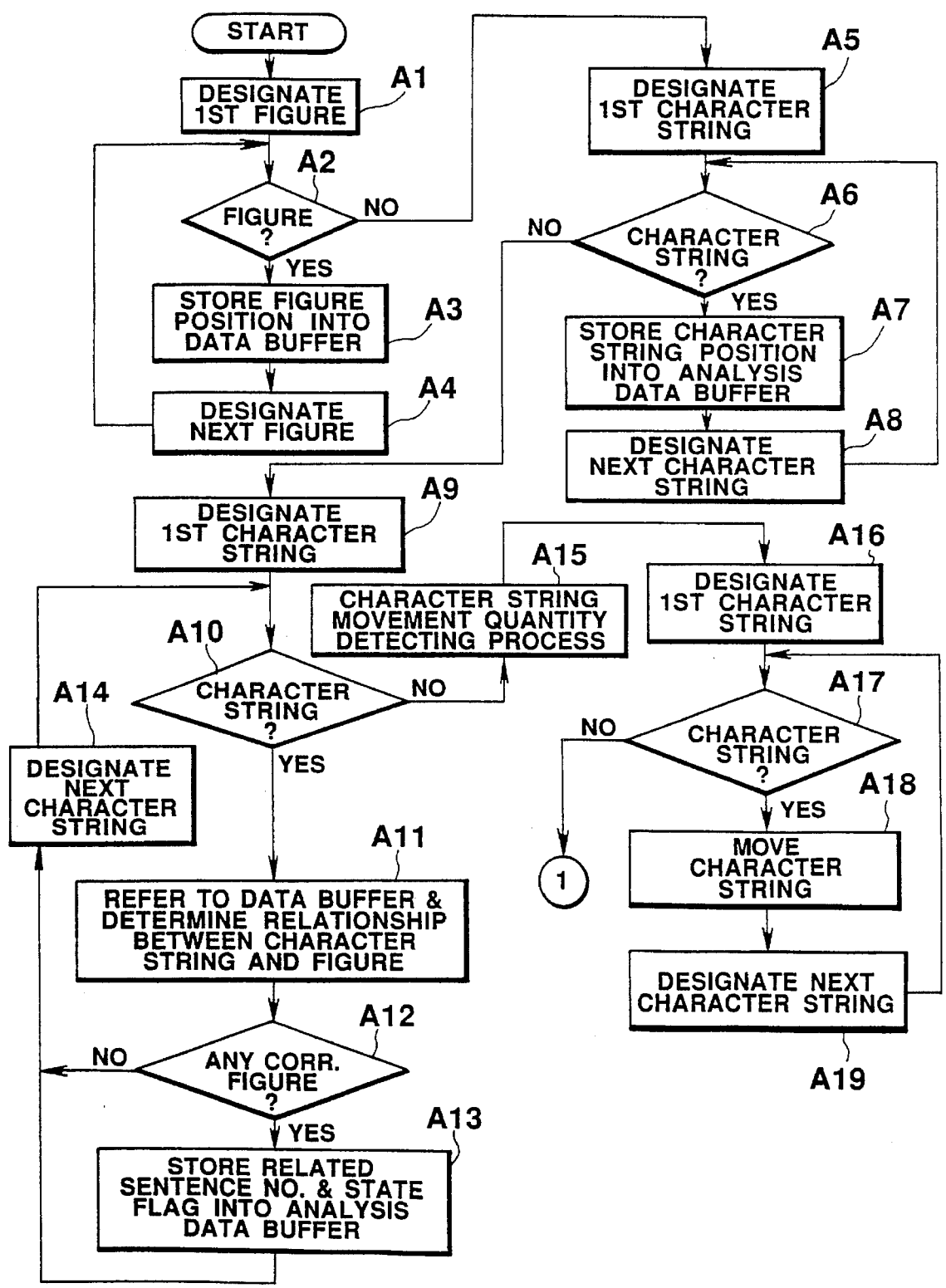

FIG. 2 is a flowchart indicative of part of the automatic layout process. FIG. 3 is a flowchart indicative of an automatic layout process continued from the flowchart of FIG. 2. FIG. 4 is a flowchart indicative of the details of a character string movement quantity detecting process at step A15 of FIG. 2.

When the user commands the execution of the automatic layout process at the keyboard 3, CPU 1 responds to that command to start the automatic layout process. CPU 1 performs a figure position detecting process where CPU 1 first analyzes the contents of the document memory 12-1 to detect the position of a figure and stores data on the result of the detection in the analysis data buffer 12-3 (steps A1–A4). That is, CPU 1 first initiates a search of a first figure in the document memory 12-1 (step A1) and checks whether there is the figure (step 2). In the case of the document of FIG. 5A, there is a horizontally rectangular frame figure which surrounds a character string as the first figure in a fourth line. Thus, CPU 1 detects the position of that figure and stores data on the result of the detection in the analysis data buffer 12-3 (step A3). Thus, as shown in FIG. 6B, CPU 1 stores data on the position of the figure "line 4, place 1 to line 4, place 8" in correspondence to the figure No. "1" in the data buffer 12-3. Control then passes to step A4 where CPU 1 initiates a search of the next figure and then returns to step A2, where it checks whether there is a figure. In this case, since there is a figure "x" superposed on a character string "language" in a fifth line, CPU 1 stores the data on the position of the figure "line 5, place 1 to line 5, place 2" in correspondence to a figure No. "2" in the analysis data buffer 12-3 (step A3). CPU 1 then initiates a search of the next figure. In this case, since there is a matrix-like table frame figure covering lines 10-12, CPU 1 stores the data on the position of the figure block "line 10, place 1 to line 12, place 12" in correspondence to a figure No. 3 in the analysis data buffer 12-3. Control then returns A2. In this case, since there is no next figure, control passes to step A5.

When the figure position detecting process ends in this way, control passes to a character string position detecting process where CPU 1 again analyzes the contents of the document memory 12-1, detects the position of a character string there, and stores data on the result of the detection in the data buffer 12-3 (steps A5–A8). More particularly, CPU 1 first initiates a search of a first character string (delimited by adjacent line feed marks) (step A5), and checks whether there is the character string (step A6). In this case, since "1. First," exists in the first line of a document of FIG. 5A, CPU 1 stores data on the position "line 1, place 1 - line 1, place 6" in correspondence to a sentence No. "1" in the analysis data buffer 12-3, as shown in FIG. 6A (step A7). Control then passes to step A8 where CPU 1 initiates a search of the next character string and then returns to step A6. Since in this case the position of the next character string covers lines 2-3, CPU 1 stores data on this position "line 2, place 1 - line 3, place 6" in correspondence to a sentence No. "2" in the analysis data buffer 12-3. Similarly, CPU 1 detects the position of each character string and stores data on this character string position in the analysis data buffer 12-3. In this case, as shown in FIG. 6A, CPU 1 stores data on 10 character string positions in correspondence to the sentences Nos. "1"- "10" in the analysis data buffer 12-3.

When the character string position detecting process ends in this way, CPU 1 performs a correspondence relationship detecting process where CPU 1 analyzes the contents of the document memory 12-1 at step A9 to detect a figure related in position to a character string, and stores data on the relationship in correspondence between the character string and the figure in the analysis data buffer 12-3 (steps A9–A14). More particularly, CPU 1 initiates a search of a first character string in the document memory 12-1 (step A9). If there is the character string (YES at step A10), CPU 1 refers to the analysis data buffer 12-3 to check the relationship in correspondence between the character string and figure (step A11). The correspondence relationship means that the character string coincides with the figure. Since the first character string has no correspondence relationship to the figure, CPU 1 detects this fact at step A12 and passes its control to step A14 where it initiates a search of the next character string and returns to step A10. Since the next character string either has no correspondence relationship to a figure, CPU 1 further initiates a search of the next character string. In this case, this character string and a horizontally long rectangular frame figure are in a correspondence relationship because their positions on the layout of the document coincide with each other. Thus, in this case, CPU 1 writes data on a sentence No. related to the figure in correspondence to a figure "1" in the analysis data buffer 12-3, as shown in FIG. 6B (step A13). Also, in this case, a state flag indicative of the relationship between the figure and the character string is also set in correspondence to the figure No. "1" in the data buffer 12-3 (FIG. 6B). The state flags used are "1", "2" and "3" which are defined as follows:

State Flag "1" This flag shows that if there is a figure covering a plurality of lines, this figure is handled as a figure block, inclusive of a character string present in the lines.

State Flag "2" This flag shows that lines continued from a figure block to a blank line are handled as incidental ones, which are handled as being included in the figure block.

State Flag "3" This flag shows that a figure is present only in a single line.

After CPU 1 sets data on the related sentence No. and state flag in the analysis data buffer 12-3 in this way, CPU 1 passes its control to step A14, where CPU 1 sequentially designates character strings one by one while iterating a similar process. As a result, as shown in FIG. 6B, CPU 1 sets data on the related sentence No. "4" and state flag "3" in correspondence to the figure No. "2" in the buffer 12-3. In addition, CPU 1 sets the related sentences Nos. "7"-"9" and the state flags "1", "2" in correspondence to the figure No. in the buffer 12-3. In this case, since the sentences Nos. "7"-"9" are for the same figure block, CPU 1 set "1" as well as "2" as state flags.

Control then passes to a character string movement quantity detecting process (step A15). FIG. 4 is a flowchart indicative of the details of the character string movement quantity detecting process. First, CPU fetches the contents of the document memory 12-1 for a character string from its head (step A15-1), refers to the layout rules, the data on which is stored in the edition rule dictionary memory 12-2, and checks whether the character string is a text (step A15-2), an idiomatic phrase (step A15-3) or a figure block (step A 15-4) from a standpoint of layout rules. In this case, since the first character string is a title which meets the above-mentioned layout rule 4, as shown in FIG. 5A, CPU 1 determines that the answer is NO at steps A15-2 to A15-4. CPU 1 calculates a movement quantity of this title character string to move the same to the left end position on a line (step A15-5), and writes data on this result into the data buffer 12-3 in correspondence to the sentence No. "1" (step A15-6).

If there is a following character string in the document memory 12-1 (step A15-7), control returns to step A15-1, where CPU 1 similarly fetches the following character string out of the document memory 12-1 and checks whether it meets the layout rules in the edition rule dictionary memory 12-2. In this case, since the character string indicated by the next sentence No. "2" is a text which includes a punctuation, CPU 1 calculates a quantity of movement corresponding to an indention for three characters from the directly preceding title (step A15-8) and writes data on that quantity in correspondence to the sentence No. "2" into the data buffer 12-3 (step A15-6). Similarly, since the character strings indicated by the next sentences No. "3" and "4" are a title and a text, respectively, CPU 1 calculates corresponding quantities of movement and writes data on those quantities into the data buffer 12-3. Sentence Nos. 5 and 6 are treated in the same manner as Sentence No. 2. Since sentences No. "7", "8", "9" are for the same figure block, CPU 1 writes data on the respective quantities of movements for centering into the data buffer 12-3 at their corresponding positions. At last, since the character string indicated by a sentence No. "10" is an idiomatic phrase registered in the edition rule dictionary memory 12-2, CPU 1 calculates a quantity of movement of the phrase to a registration position the data on which is registered beforehand in the edition rule dictionary memory 12-2, in correspondence to the phrase (step A15-9) and writes data on the quantity of movement into the data buffer 12-3 at a position corresponding to the sentence No. "10".

When detection of quantities of movement corresponding to all the character strings ends, control passes to step A16 of FIG. 2, where CPU 1 performs a character string moving process for moving the respective character strings in accordance with the corresponding quantities of movement (steps A16–A19). That is, CPU 1 analyzes the contents of the document memory 12-1, initiates a search of the first character string among those contents (step A16) and checks whether there is such character string (step A17). Since the first character string in the document memory 12-1 is a title, CPU 1 fetches data on the quantity of movement which is stored in the data buffer 12-3 in correspondence to that character string (sentence No. "1") and moves the appropriate character string in correspondence to that quantity of movement the data on which is stored in the memory 12-1 (step A18). This moves the title character string to a leftward shifted position. CPU 1 then initiates a search of the next character string (step A19). If there is the character string (step A17), CPU 1 moves the character string in accordance with the quantity of movement the data on which is stored in the buffer 12-3 in correspondence to that character string (sentence No. "2") (step A18). In this case, the character string is a text, and therefore moved to a position indented by three characters from the directly preceding title. Similarly, a character string corresponding to the next sentence No. "3" is also a text, and therefore moved to a leftward shifted position. Further, the character string corresponding to the next sentence No. "4" is also a text, and therefore moved to a position indented by three characters from the directly preceding title. The character strings indicated by Nos. "5" and "6" are moved in the same manner as Sentence No. 2, while figure 3 containing Sentence Nos. 7–9 is moved to the central position, with the width of the figure block equal to the width of the characters. Finally, since the character string indicated by a sentence No. "10" is an idiomatic phrase, the appropriated character string is moved to a new position (rightward shifted position) the data on which is beforehand registered in correspondence to that idiomatic phrase.

CPU 1 then performs a figure moving process for moving a figure related in position to a character string in conjunction with the character string moving process (steps A20–A23). At first, CPU 1 searches through the document memory 12-1 for a first figure (step A20). CPU 1 first designates search. If there is a figure (step A21), CPU 1 refers to the data buffer 12-3 and fetches data on a related sentence No. corresponding to the figure, accesses the buffer 12-3 with that sentence No. and moves the appropriate figure by the corresponding quantity of movement (step A22). In this case, the first figure is on a horizontally long rectangular frame figure, and the related sentence No. is "3". Thus, CPU 1 moves this frame figure to the leftward position in conjunction with the movement of the title character string corresponding to this sentence No. CPU 1 then initiates a search of the next figure (step A23). If there is the next figure (step A21), CPU 1 moves that figure (step A23). In this case, the next figure is an "x" mark corresponding to the related sentence No. "4". Thus, CPU 1 moves the figure to a position which is indented by three characters from the directly preceding title in conjunction with the quantity of movement of the text. Since the next figure is a figure block indicative of a table frame, CPU 1 moves in a lump the overall figure block, to the central position in conjunction with the movement of the character string in that figure.

As described above, when the automatic layout process has been effected and the layout of the document of FIG. 5A including figures, which document is stored in the document memory 12-1, has been automatically changed, the respective character strings are moved to and disposed at proper positions respectively in accordance with the layout rules stored in the edition rule dictionary memory 12-2. The figures having a relationship in position with the character strings are also moved automatically in accordance with quantities of movement of the corresponding character strings. The resultant layout of the document including the figures is shown in FIG. 5B.

While in the above embodiment the unit of a character string is illustrated as existing between any one and the next line feed marks, it may be each line. The layout rules in the dictionary are not limited to the above embodiment, of course. In this case, the layout rules are not limited to fixed ones, but may be ones set arbitrarily by the user in accordance with the user's purposes of use.

According to the present invention, if there is a figure, related to a document which is moved to a proper position in the automatic layout process, the figure can be moved automatically in conjunction with the movement of the text. Thus, the user is not required to perform an operation of designating the figures one by one while moving the respective figures after the automatic layout process. Thus, a change of the layout is achieved steadily without requiring the user to do that troublesome work.

The character string which is subjected to the automatic layout process includes not only an idiomatic phrase such as "date" but also a single numeral.

The figure data may be moved in conjunction with character strings containing letters or numerals.

What is claimed is:

1. A word processor for performing an automatic layout process to determine a new layout of a document, the document including plural character strings and figures, the character strings being a series of plural characters and a category of the character string being determined depending on a position where the character string is originally disposed, comprising:

a) document storage means for storing a document, the document including plural character strings and at least a figure, and for storing position data of the character strings and the figure, the position data representing a position in a layout of the document at which position the character string or the figure is disposed;

b) layout rule storage means for storing a layout rule specifying a position in a new layout of a document at which position a character string is to be disposed depending on the category of the character string;

c) character string moving means for judging a category of each of the character strings of the document stored in said document storage means and for moving the character string to the position specified by the character string's category as determined by the layout rules stored in said layout rule storage means;

d) determining means for judging whether the figure included in the document stored in said document storage means has position data identical to the original position data of any of the character strings moved by said character string moving means; and e) figure moving means for, when said determining means determines that the figure has the position data identical to the original position data of the character string moved by said character string moving means, moving the figure to the position in the new layout of the document, to which position the character string has been moved by said character string moving means.

* * * * *